United States Patent [19]

Amezcua et al.

[11] Patent Number: 4,458,331
[45] Date of Patent: Jul. 3, 1984

[54] INTERACTIVE DISPLAY TERMINAL WITH ALTERNATING DATA PROCESSING AND TEXT PROCESSING SESSIONS WITH TEXT PROCESSING STATUS LINE OPERABLE DURING DATA PROCESSING SESSION

[75] Inventors: Robert Amezcua, Austin; Silous F. Clements, Georgetown; Richard P. Dachowski, Round Rock; Patrick D. Motola, Austin, all of Tex.

[73] Assignee: International Business Machines Corporation, Armonk, N.Y.

[21] Appl. No.: 309,985

[22] Filed: Oct. 9, 1981

[51] Int. Cl.³ .............................................. G06F 3/14
[52] U.S. Cl. ................................................. 364/900
[58] Field of Search ... 364/200 MS File, 900 MS File

[56] References Cited

U.S. PATENT DOCUMENTS

| | | | |
|---|---|---|---|
| 3,643,252 | 2/1972 | Roberts, Jr. | 340/721 |
| 3,891,792 | 6/1975 | Kimura | 364/900 |
| 4,015,245 | 3/1977 | Mercurio et al. | 364/200 |
| 4,079,449 | 3/1978 | Mercurio et al. | 364/900 |
| 4,195,353 | 3/1980 | Abe et al. | 364/900 |
| 4,198,685 | 4/1980 | Corwin et al. | 364/900 |
| 4,392,197 | 7/1983 | Couper et al. | 364/200 |

*Primary Examiner*—Jerry Smith
*Assistant Examiner*—Mark P. Watson
*Attorney, Agent, or Firm*—C. Lamont Whitham; J. B. Kraft; John J. Jackson

[57] ABSTRACT

A display word processor (11) has the capability of emulating a data processing terminal for a host data processor (10) in an information processing system. With such a capability, the display word processor may be switched between data processing and word or text processing sessions. In this information processing system, the interactive display (17) is operable during data processing sessions to display a word processing message when a word processing task is being carried out as a background task during the data processing session. The word processing message may be displayed on a message line (7) which may be shared with a data processing message. Alternatively, if the interactive display terminal (17') is large enough, the word processing message line (9) may be displayed in an area dedicated to the word processing message.

7 Claims, 8 Drawing Figures

INTERACTIVE DISPLAY TERMINAL WITH ALTERNATING DATA PROCESSING AND TEXT PROCESSING SESSIONS WITH TEXT PROCESSING STATUS LINE OPERABLE DURING DATA PROCESSING SESSION

DESCRIPTION

Technical Field

This invention relates to a display word processor having the capability of emulating a data processing terminal, and more particularly to the display of a text or word processing status line during data processing sessions when the text or word processing operations are being carried out as a background task during the data processing sessions.

Background Art

It has been recognized that a stand-alone or shared logic text or word processor with a communication adapter can be used as a terminal for a remote host data processor. Generally, when the text or word processor is used as a data processing terminal, it is dedicated solely to the data processing function and does not perform a word processing function. However, this is not an efficient use of the word processor which is capable of carrying out a background task. For example, suppose that an operator has completed a word processing session in which a document has been either created or revised on a CRT display screen with the document now stored in memory such as a diskette. The operator wants the document to be printed but also wants to enter a data processing session by communicating with a remote host data processor with the word processor. Often, the operator would either have to postpone having the document printed or wait until the document has printed before beginning the data processing session. During the data processing session, the word processor emulates a data processing terminal with the display and keyboard functions being controlled by the host data processor. Since the word processor is capable of carrying out the printing operation as a background task during a data processing session, it is desirable for it to do so. In order to do so, however, it is necessary to provide some means of communicating with the operator should the background word processing task require attention during the data processing session.

Known in the prior art are U.S. Pat. Nos. 4,015,245 and 4,079,449, both issued to Mecurio et al. These patents disclose what is described as a biprogrammable accounting machine capable of simultaneously running two programs. For example, one program carries out invoicing or accounting work requiring continuous intervention by the operator, and the other program carries out file or record updating work not requiring frequent interventions by the operator. The machine has a single line visual display and is also provided with a buzzer and a lamp. If, during the course of inputting data for the first program, the second program should require operator attention, the buzzer is sounded and the lamp is lighted. The operator can then switch a changeover switch so that a message from the second program can be displayed. The Mercurio et al machine does not provide a CRT display such as commonly used in more sophisticated word processing and data processing functions. Moreover, the Mercurio et al machine requires manual intervention by the operator in order to display a message pertaining to the second program.

DISCLOSURE OF THE INVENTION

The present invention provides the operator with a text or word processing status line on a CRT display, which status line is operable during the data processing sessions when the word processor is being used as a terminal for a remote host data processor. This status line gives the status of text processing operations when text processing operations are being carried out as a background task during data processing sessions.

When in the data processing mode, the word processor emulates a data processing terminal. Interactive data processing terminals in current use having a CRT display have the capability of displaying in the order of twenty-five lines of alpha-numeric characters, and typically one of these lines is dedicated as a message line for the operator, the other twenty-four lines being data lines. Word processors, on the other hand, are being provided with several sizes of CRT display. There are two fairly standard displays in current use. One has the capability of displaying twenty-five lines, and the other, sixty-six lines. The latter display is often referred to as a full page display. In the case of the twenty-five line display, the invention provides for the sharing of the message line between data processing and background word processing functions. In the case of the larger sixty-six line display, the invention defines two message lines, one for the data processing function, and the other for the background word processing function.

BEST MODE FOR CARRYING OUT THE INVENTION

Figure 1A:
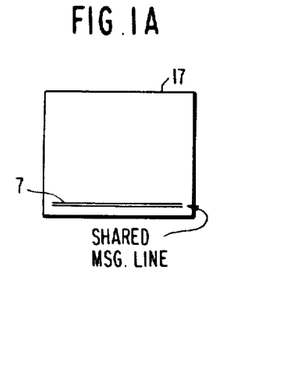
FIG. 1A illustrates a twenty-five line CRT display having a shared message line according to the invention.
Figure 1B:
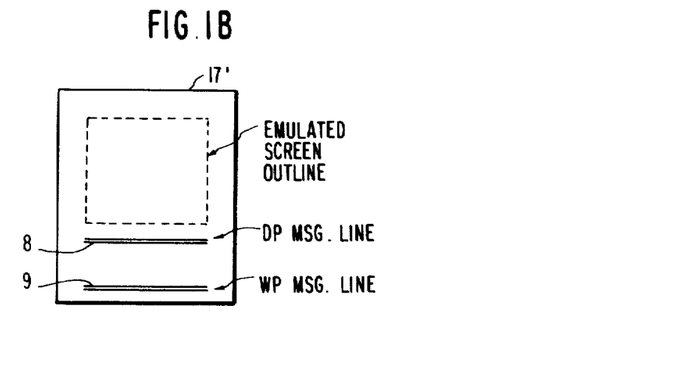
FIG. 1B illustrates a sixty-six line CRT display having separately defined data processing and word processing message lines according to the invention.

Referring now to FIGS. 1A and 1B of the drawings, there is illustrated a twenty-five line CRT display 17 and a sixty-six line CRT display 17', respectively. In the twenty-five line display 17 shown in FIG. 1A, there is a shared message line 7. On the other hand, in the sixty-six line display shown in FIG. 1B, there is a separate data processing message line 8 and a separate word processing message line 9. In the twenty-five line display shown in FIG. 1A, the data processing message is normally displayed on line 7 during the data processing emulation mode. The word processing message is normally not displayed in this mode. The data processing message in its entirety is displayed when there is no queued message from the background word processing task. Should there be a queued word processing message, however, the data processing message is displayed on line 7 preceded by a blinking arrow symbol in display 17. In the larger display 17' shown in FIG. 1B, the data processing message line 8 is normally displayed, and the word processing message line is normally blank during the data processing emulation mode. In order to better emulate a data processing terminal, the screen outline of the smaller display provided by the emulated data processing terminal may be drawn as illustrated by the dotted line above the data processing message line 8. When there is a queued word processing message, the blinking arrow appears at the beginning of line 9.

The blinking arrow symbol indicates to the operator that there is a word processing message in queue, and this message may be displayed by depressing a message key on the keyboard provided for that purpose. There are basically two kinds of messages that may be queued for display: an information message and an action message. An example of the former would be a statement that the printing operation is complete, while an example of the latter would be that the printer is out of paper. When the blinking arrow appears, the operator may continue the data processing operations then in progress and, when convenient, depress the message key. By depressing the message key, the queued word processing message is displayed on the shared message line 7 in place of the data processing message or is displayed on line 9 in the case of the larger display, but in either case the data processing display being displayed continues to be displayed. If the word processing message is merely an information message, the operator may simply make note of it and return the data processing message to the display and remove the word processing message from queue by depressing any data processing key. Should the word processing message be an action message, the operator may either choose to take the action requested, i.e. supply paper, now or later. If the requested action is performed, the word processing message is automatically removed from queue and, as a result, the data processing message is returned to the display without further action by the operator. On the other hand, if the requested action is postponed and the operator depresses a data processing key, the data processing message is returned to the display but the word processing message is not removed from queue. The blinking arrow remains as long as there is a word processing message in queue. It will be understood that in the case of the larger sixty-six line display shown in FIG. 1B, the data processing message is never removed from the display by depressing the message key to display a word processing message on line 9. But even in the case of the larger sixty-six line display, the types of word processing messages described above will not automatically be displayed on line 9, and the operator must still depress the message key in order to display the word processing message.

There is another type of word processing message which is called a priority action message. An example of such a message would be one to alert the operator that a disk drive door has been left open. Such a condition is one that requires immediate action by the operator and cannot be postponed. Whenever there is a priority action message, the message is immediately displayed without requiring the operator to depress the message key. Thus, in the case of the smaller display shown in FIG. 1A, any data processing message would automatically be replaced on line 7 by the priority action word processing message, and in FIG. 1B, the priority action word processing message would be automatically displayed on line 9. The only way the priority action message can be removed from the display is to take the action required.

Figure 2:
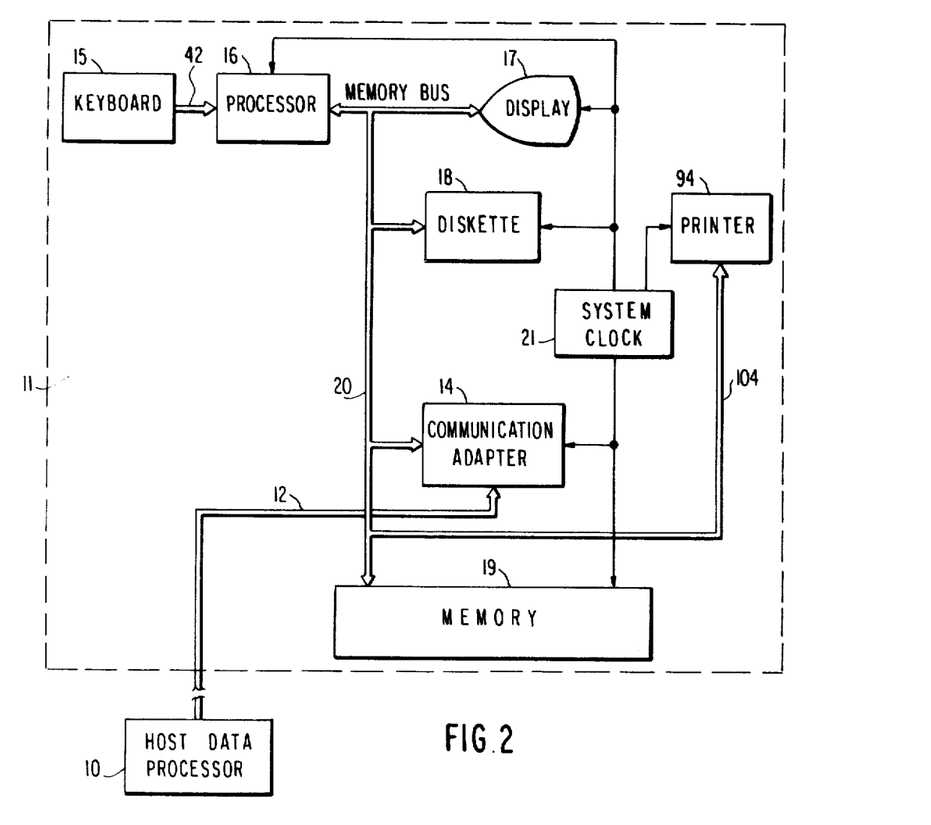
FIG. 2 is a logical block diagram of a word processor having a communication adapter for connection with a host data processor.

Turning now to FIG. 2 of the drawings, a system used in accordance with the present invention is shown. This system comprises a host data processor 10 and a text or word processor 11 remote from the host data processor. The host data processor 10 and the word processor 11 communicate with each other over a bus 12. The word processor 11 has a communication adapter 14 which is connected to the buss 12. This communication adapter 14 may be any standard device having the capability, at the transmitting end, of converting parallel to serial data so that the data may be communicated over external telephone lines and, at the receiving end, for reconverting the received serial data into parallel form so that it may be handled by the receiving processor. Such communications adapters are known in the art and will not be described in detail since they are not directly involved in the present invention. In any event, the mode of communication over buss 12 which represents the link between the host data processor 10 and the word processor 11 is synchronous serial communication. The communication adapter which can be used in the present invention is described in detail in the copending application of D. M. Benignus et al assigned to the assignee of the present invention, Ser. No. 274,300, filed 6/16/81. For purposes of describing the communications adapter, said copending application is hereby incorporated by reference.

In the word processor 11, the operator accesses the machine through operator control keys on keyboard 15. The keyboard drives a processor 16. The processor 16 is operably interconnected into a visual display 17, a diskette 18, and a random access memory 19 by a memory buss 20. A system clock 21 is provided for timing functions within the word processor 11. The information transmitted from the host data processor 10 to the word processor 11 is serially and synchronously sent over buss 12 to communications adapter 14. Communications adapter 14 does a serial to parallel conversion of the input data and sends it over memory buss 20 to memory 19 which has the capability of storing the received data and displaying it on display 17.

Figure 3:
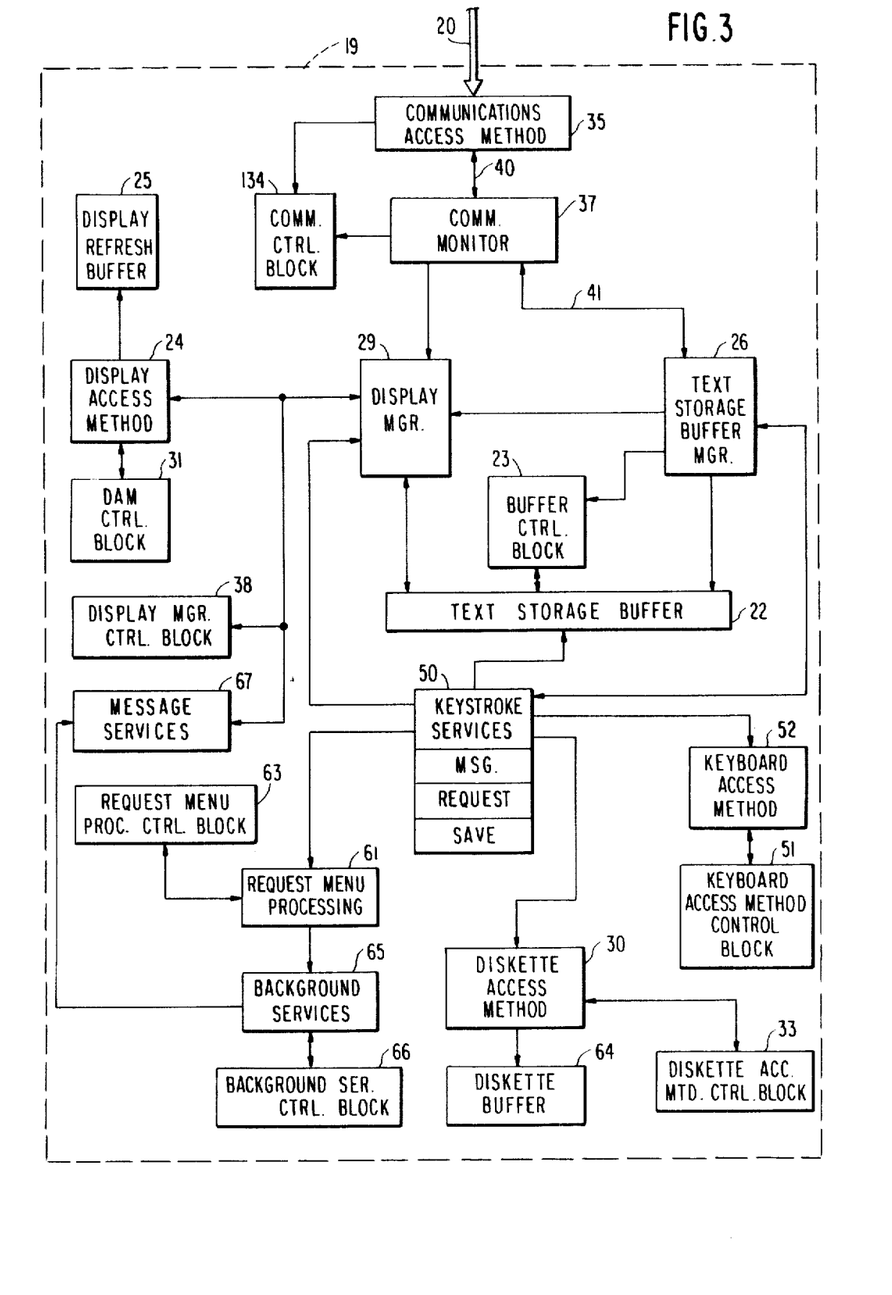
FIG. 3 is a logical block diagram showing the memory organization of the word processor illustrated in FIG. 2.

Memory 19 is shown in more detail in FIG. 3 and includes a number of functional programs and data areas or control blocks which support the functional programs for operating with the data input into memory 19 through buss 20 from the communications adapter 14. The received data sent to memory 19 from communications adapter 14 over memory buss 20 is stored in text storage buffer 22 sequentially in the order in which it is received. The handling and updating of data stored in text storage buffer 22 is controlled by routines stored within text storage buffer manager 26. A display manager 29 controls the formatting of alpha-numeric text representative of the stored data on display 17 through display access method 24 and display refresh buffer 25.

It should be noted that the display refresh buffer 25 may operate in any conventional manner.

Text storage buffer manager 26 is connected to text storage buffer 22. The text storage buffer manager 26 is further connected to buffer control block 23. In displaying the alpha-numeric characters, the character data stored in buffer 22 is communicated to display access method 24 via display manager 29. It should be noted that corresponding diskette access method 30 is used instead of display access method 24 when communication between the text storage buffer 24 and the diskette 18 is desired.

A display control block 31 is connected to display access method 24. The corresponding diskette control block 33 is connected to the diskette method access 30 when access to the diskette drive is desired.

As soon as information from communication adapter 14 is received by the text storage buffer 22, this information is transmitted via display manager 29 to display access method 24 and then to display refresh buffer 25. The information stored in display refresh buffer 25 is represeentative of the actual alpha-numeric information shown on display 17. The display control block 31 serves to store flags and status information as required by the operation of display access method 24.

As previously described, received data is transferred from the communication adapter 14 to the text storage buffer 22 over buss 20. Actually, the process involves several steps. Information from communications adapter 14 is put onto buss 20 which takes the data to communications access method 35 under the direction of communication control block 134 after which the data is transmitted over channel 40 to communications monitor 37. The information from the communications monitor 37 is input over channel 41 to text storage buffer manager 26, previously described. Then the data is input to the text storage buffer 22 under the direction of buffer control block 23.

As previously described, the operator controls processes through a keyboard 15 communicating through processor 16. As the operator enters each key stroke at the keyboard 15, a corresponding signal is transmitted through channel 42 to processor 16 which enters the key stroke command into the memory 19. In the memory, upon the receipt of a key stroke command, a key stroke routine is used by key stroke services 50 to handle the particular command received. This is carried out under the control of keyboard access method control block 51 via keyboard access method 52. The key stroke command is then processed to the text storage buffer manager 26 which has the program to control buffer control block 23 to carry out various processes with respect to the data stored in the text storage buffer 22.

In the present invention, the key stroke services 50 also calls the request menu processing 61. The request menu processing 61 is controlled by the request menu processing control block 63. The background services 65 receives input from the request menu processing block 61 and is controlled by the background service control block 66. The output of the background services 65 is provided as input to the message services 67 which in turn calls the display access method 24 to display a message line on the display 17. In the case where the display 17 is the larger sixty-six line display, a display manager control block 38 provides the control data for display manager 29 to draw a box outline as shown by the dotted line in FIG. 1B and to move the data processing message line adjacent this box outline.

Using the hardware just described in FIGS. 2 and 3, the processes of handling the message line in accordance with the present invention will now be described.

Figure 4:
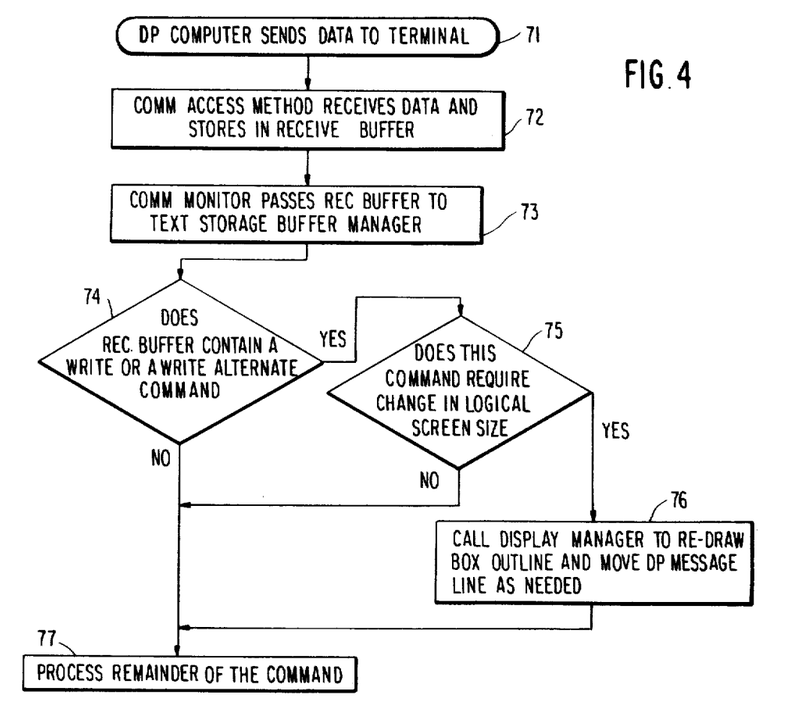
FIG. 4 is a flow chart of the operation involved in moving the data processing message line to a new location on a large display when the logical screen size has changed.

FIG. 4 shows the flow chart for the operations involved in moving the data processing message line to a new location on the larger sixty-six line display when the logical screen size is changed to emulate the screen size of a data processing terminal.

First, it is assumed that the word processor 11 is in a data processing emulation mode. In this mode, the host data processor 10 sends data to the word processor 11 on buss 12 as indicated in the first step 71 of the flow chart shown in FIG. 4. The data transmitted by the host data processor 10 to the word processor 11 is received by the communication adapter 14 via buss 12. The communication adapter 14 transmits the received data via buss 20 to the communications access method 35 which stores the data in a receive buffer as indicated by step 72. In step 73, the communication monitor 37 passes the data in the receive buffer to the text storage buffer manager 26. Then in step 74, a decision is made as to whether the receive buffer contains a write or a write alternate command. If the decision is yes, then the process proceeds to step 75. Otherwise, the process proceeds to step 77. In step 75, a decision is made as to whether the command requires a change in logical screen size. Such a change is required as previously described when a sixty-six line display 17' is provided for the word processor 11. If such a display is provided, then the process proceeds to step 76. Otherwise, the process proceeds to step 77. In step 76, the display manager 29 is called to re-draw the box outline and move the data processing message line as required. The process then proceeds to step 77 where the remainder of the command is processed.

Figure 5:
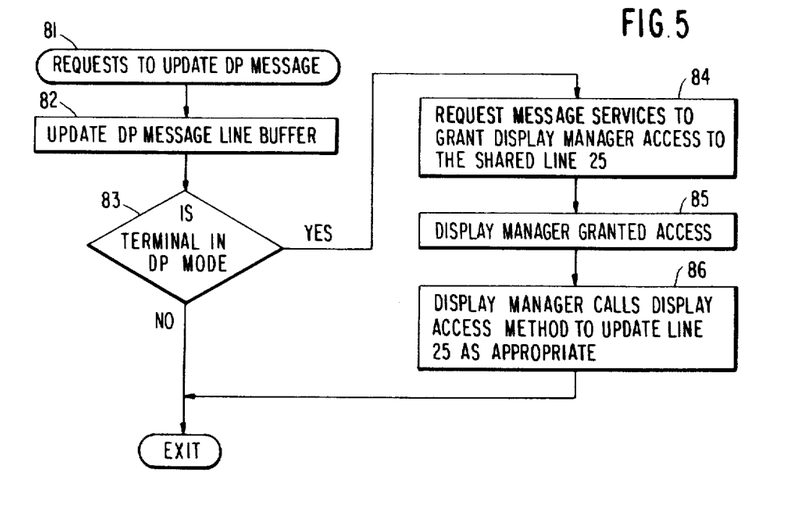
FIG. 5 is a flow chart of the operation involved in updating the data processing message.

In the case of the twenty-five line display, the flow chart shown in FIG. 5 shows the process involved in updating the data processing message. As will be recalled, the twenty-five line display requires a shared message line 7 as shown in FIG. 1A. In this routine, if the word processor 11 is in the word processing mode, only the data processing message line buffer is updated, but not the screen. As shown in FIG. 5, the routine begins with step 81 which is a request to update the data processing message. In step 82 the data processing message line buffer in the message services 67 is updated. Then in step 83, a decision is made as to whether the word processor 11 is in the data processing mode. If it is, then the process proceeds to step 84. Otherwise, no further action is taken and the routine exits. In step 84, a request is made to the message services 67 to grant the display manager 38 access to the shared message line. In step 85, the display manager 29 is granted access. Next in step 86, the display manager 29 calls the display access method 24 to update the shared message line as appropriate. After the completion of step 86, the routine exits. Again, it should be remembered that for the larger sixty-six line display, updates to the data processing message are displayed immediately because no sharing of the message line is required.

Figure 6:
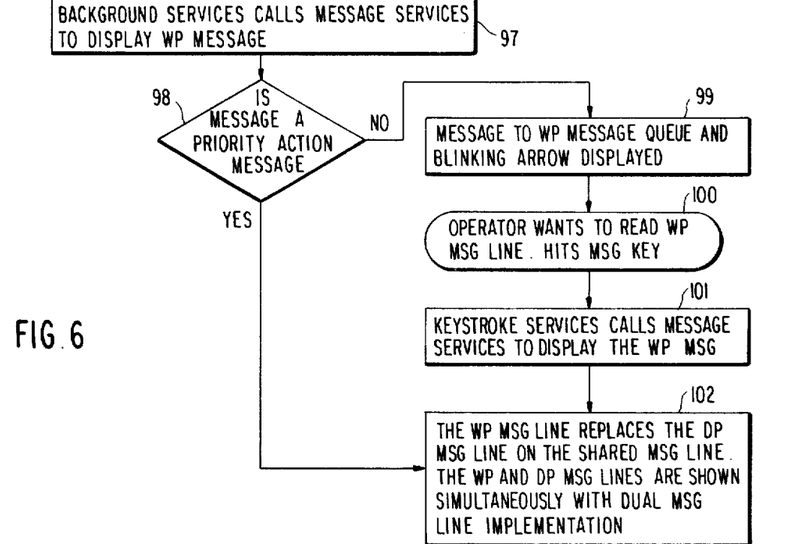
FIG. 6 is a flow chart of the operation involved in displaying the word processing message.

In the case where the word processor 11 is in the data processing emulation mode and the background word processing task needs to communicate a message to the operator, this process is shown in FIG. 6. First, as shown by step 97, background services 65 calls message services 67 to display the word processing message. Then in step 98 a decision is made as to whether the word processing message to be displayed is a priority action message. If it is, the process proceeds to step 102. Otherwise, the message is put into the word processing message queue and the blinking arrow is displayed by calling the display access method 24 as shown in step 99. Now if the operator having noticed the blinking arrow wants to read the word processing message, the operator in step 100 depresses the message key. This results in step 101 in keystroke services 50 calling message services 67 to display the word processing message. Then in step 102 the word processing message replaces the data processing message on the shared message line 7 or is displayed simultaneously on line 9 with the data processing message on line 8. Returning to the decision step 98, it will once again be appreciated that a priority action message is immediately and automatically displayed without the operator depressing the message key.

Figure 7:
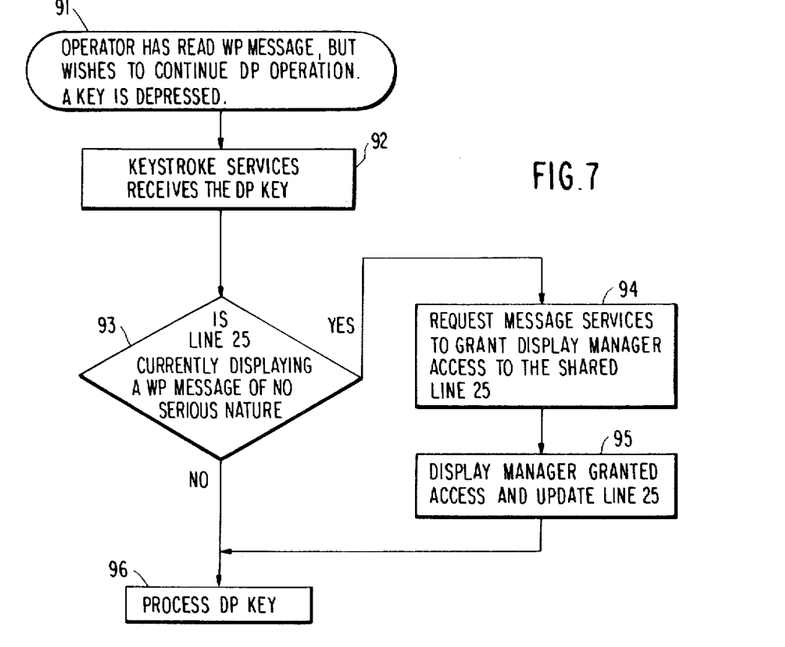
FIG. 7 is a flow chart of the operation involved in replacing a word processing message by a data processing message.

Next, assuming that the word processor 11 is displaying a word processing message on the shared message line 7 and the operator having read the word processing message desires to continue a data processing operation, FIG. 7 shows the flow chart for the replacement of the word processing message by the data processing message on the twenty-five line display. As indicated by step 91, the operator has read the word processing message and now wishes to continue the data processing operation. This is accomplished simply by depressing a key indicating that the data processing operation is to be continued. Next, in step 92 the key stroke services 50 receives a signal produced by the depression of a data processing key. At this point indicated by step 93, a decision must be made as to whether the shared message line is currently displaying a word processing message other than a priority action message. If so, then the process proceeds to step 94. Otherwise, the process proceeds to step 96. In step 94, a request is made to message services 67 to grant the display manager 29 access to the shared message line. In step 95, the display manager 29 is granted access and updates the shared message line to now display the data processing message line in place of the word processing message line. Then, in step 96, the data processing key depressed by the operator is processed.

Figure 8:
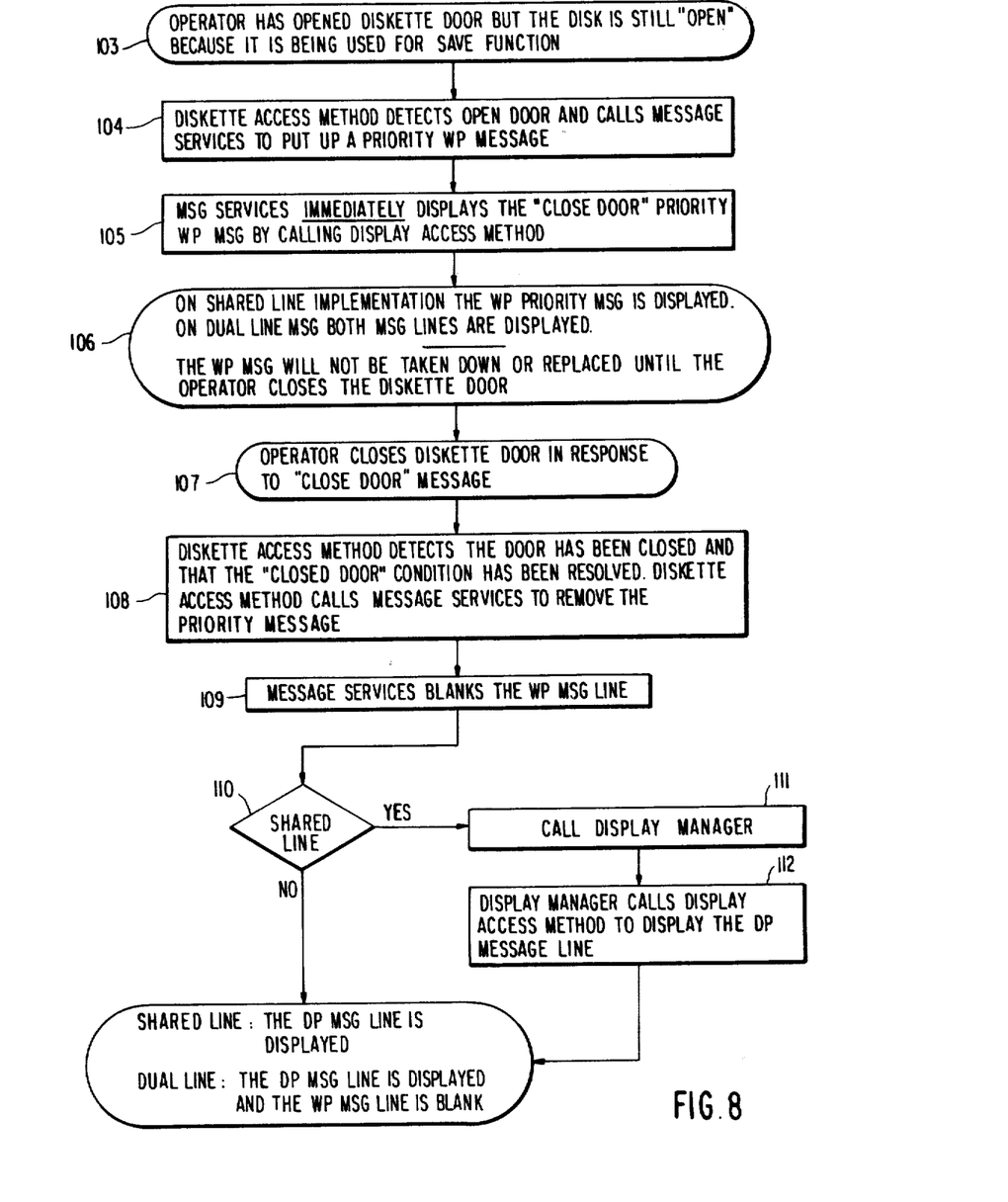
FIG. 8 is a flow chart of the operation involved in displaying a priority action word processing message.

The case where a priority action message is displayed is shown in FIG. 8. To begin with, it is assumed that a data processing message is currently displayed. It is further assumed that the operator has opened a diskette door but the disk is being used for a data save function as shown in step 103. Should this occur, the diskette access method 30 detects the open door condition and calls message services 67 to display a priority action word processing message as shown in step 104. As a result in step 105, message services 67 displays the priority action message by calling display access method 24. The word processing message can be removed only by taking the action required as shown in step 106. Assuming as shown by step 107 that the operator takes the required action, the diskette access method 30 detects that the door has been closed and calls message services 67 to remove the priority action message as shown in step 108. Then message services 67 removes the word processing message by calling display access method 24 as shown in step 109. When this is done, a decision must be made in step 110 as to whether the message was displayed on a shared line, i.e. whether the twenty-five line display 17 is used in the word processor 11. If so, the display manager 29 is called in step 111, and in step 112, the display manager calls display access method 24 to display the data processing message line.

While the invention has been particularly shown and described with reference to a preferred embodiment, it will be understood by those skilled in the art that various other changes in form and detail may be made without departing from the spirit and scope of the invention.

We claim:

1. In an information processing system comprising an interactive display terminal used with a word processor to display text in a word processing mode wherein the word processing operations affect only the format of the displayed text or alternately used with a data processor to display data in a data processing mode wherein the data processing operations affects the value of the displayed data, said interactive display terminal displaying a data processing message line to the operator while in the data processing mode and said word processor being capable of carrying out a background word processing task while said interactive display terminal is in the data processing mode, the improvement comprising,
    means operative during the data processing mode of the interactive display terminal and while a background word processing task is being performed for displaying a message to the operator relative to the word processing task.

2. The information processing system of claim 1 wherein said means for displaying said message relative to the word processing task comprises a portion of the display dedicated to the display of said message on a message line separate from said data processing message line.

3. The information processing system of claim 1 wherein said means for displaying said message relative to the word processing task comprises means for displaying said message on said data processing message line.

4. The information processing system of claims 2 or 3 further comprising means for queuing a message relative to the word processing task for display and wherein said means for displaying said message comprises
    means coupled to said means for queuing for displaying an indicia indicating that a message has been queued for display, and
    means actuated by an operator to cause the queued message to be displayed.

5. The information processing system of claims 2 or 3 further comprising means for queuing a message relative to the word processing task for display and wherein said means for displaying said message comprises
    means coupled to said means for queuing for displaying an indicia indicating that a message has been queued for display,
    first means actuated by an operator to cause the queued message to be displayed, and
    when the displayed message requests an action by the operator, means responsive to the performance by an operator of an action requested by said message for removing said message from queue and display.

6. The information processing system of claims 2 or 3 further comprising means for queuing a message relative to the word processing task for display and wherein said means for displaying said message comprises
    means coupled to said means for queuing for displaying an indicia indicating that a message has been queued for display, first means actuated by an operator to cause the queued message to be displayed, when the displayed message requests an action by the operator, means responsive to the performance by an operator of an action requested by said message for removing said message from queue and display, and second means actuated by an operator to remove said message from display but not from queue without taking the action requested by said message, said means for displaying said indicia continuing to display said indicia as long as a message remains in queue.

7. The information processing system of claims 2 or 3 further comprising means for queuing a message relative to the word processing task and wherein said message may be a priority message or a non-priority message, said non-priority message being queued for display and said means for displaying said message immediately displaying said priority message, and wherein said means for displaying said message further comprises means coupled to said means for queuing for displaying an indicia that a non-priority message has been queued for display, and means actuated by an operator to cause the queued non-priority message to be displayed.

* * * * *